UNITED STATES PATENT OFFICE.

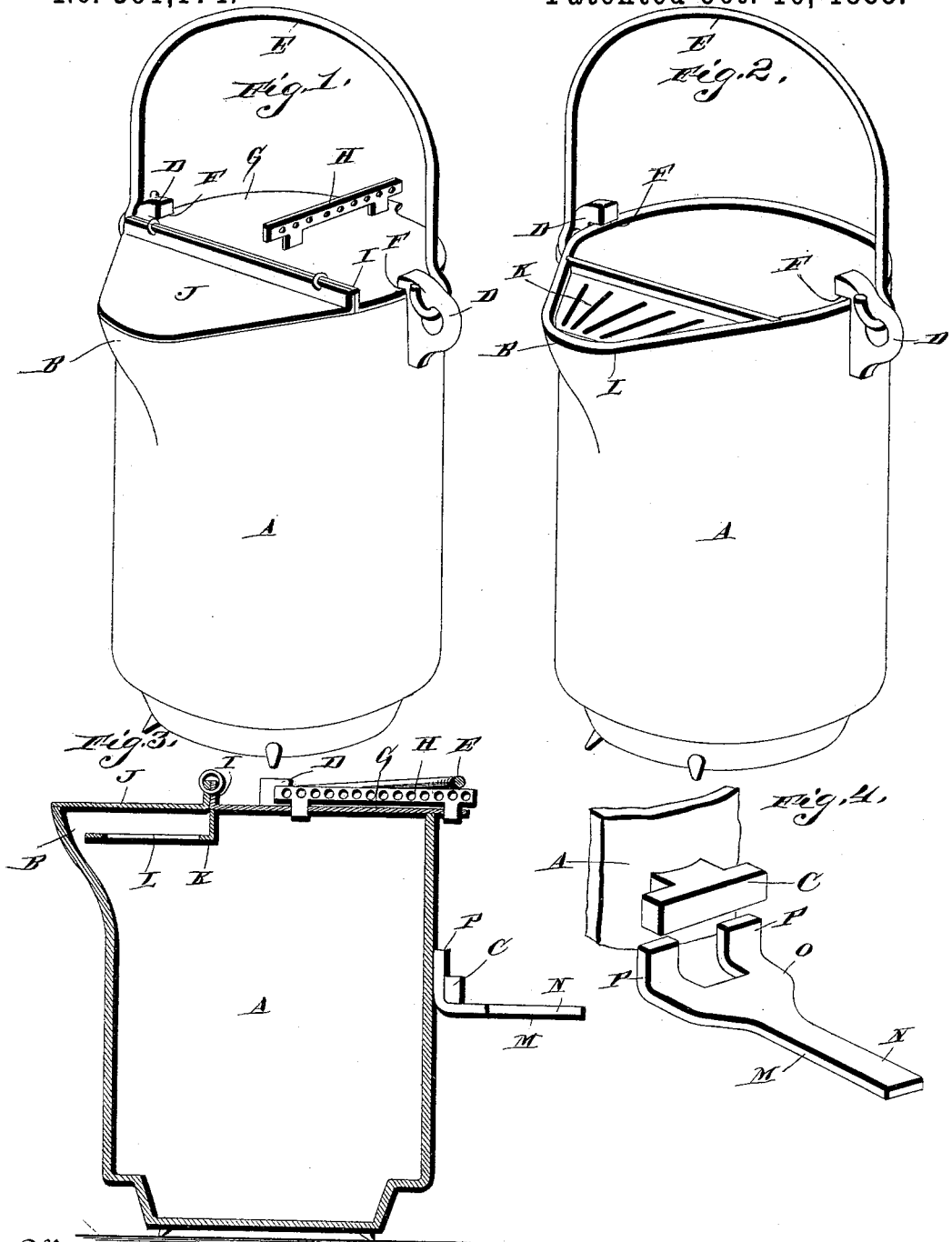

JOHN PRESTON McKEE, OF WAYNE, IOWA.

DINNER-POT.

SPECIFICATION forming part of Letters Patent No. 391,174, dated October 16, 1888.

Application filed January 10, 1888. Serial No. 260,285. (No model.)

*To all whom it may concern:*

Be it known that I, JOHN PRESTON MCKEE, a citizen of the United States, residing at Wayne, in the county of Henry and State of Iowa, have invented a new and useful Improvement in Dinner-Pots, of which the following is a specification.

My invention relates to improvements in dinner-pots; and it consists in certain novel features, hereinafter described and claimed.

In the accompanying drawings, Figure 1 is a perspective view of my improved dinner-pot. Fig. 2 is a perspective view with the lid removed. Fig. 3 is a vertical section of the pot, and Fig. 4 is a detail view of the lifting-fork.

Referring to the drawings by letter, A indicates a dinner-pot provided in front, at its upper edge, with a spout, B, and on its rear side, near its bottom or lower edge, with a T-shaped lug or projection, C. At diametrically-opposite points of the upper edge of the dinner-pot and midway between the parallel vertical planes of the spout and the T-shaped projection I provide the perforated ears or lugs D, in which the ends of the bail or handle E are engaged and pivotally secured. The inner opposing faces of these ears or lugs D are provided with the horizontal grooves F in the plane of the upper edge of the dinner-pot, as shown, and the cover G slides in these grooves. Upon this sliding cover G, I erect a bail-rest, H, which also serves as a handle to slide the cover into position.

When the pot is on a stove, the bail or lifting-handle rests upon the bail-rest H, and is thereby held out of contact with the pot and the cover, and consequently will not become heated, so as to burn the hands and fingers of the person handling the pot. The bail-rest is provided with a number of transverse perforations, or is otherwise constructed in an open-work manner, so as to permit the circulation of air therethrough and prevent the heating of the same. The front edge of the sliding cover is provided with an upturned flange, I, to which I secure, by suitable hinges, a swinging lid, J, which extends over and closes the mouth of the spout B, as shown. Within the spout and extending entirely across the same I provide the plate K, having the openings L, which may be either perforations or slots, as shown.

By the construction just described the obnoxious odors rising from cooking vegetables are effectually prevented from escaping into the room. When the cooking is finished, the water may be poured off through the spout, while the perforated plate in the spout will allow the water to pass through, but prevent the escape of the article or articles being cooked.

M designates a tilting-fork, consisting of the bar or handle N, having the integral yoke O at one end provided with the right-angled lips P, as shown. When it is desired to tilt the pot, this tilting-fork is made to engage the T-shaped projection on the dinner-pot, and the pot is then tilted, as will be readily understood.

Having thus described my invention, what I claim, and desire to secure by Letters Patent, is—

The combination of the dinner-pot having a slotted plate, K, in the upper end of its spout and provided with the ears D, having horizontal grooves in their inner faces, the lid sliding in said grooves and having a vertical flange at its front edge, the cover hinged to said flange and adapted to close the spout of the dinner-pot, the bail-rest on the sliding lid, and the bail pivoted to the ears D and adapted to be supported by the said bail-rest, substantially as specified.

In testimony that I claim the foregoing as my own I have hereto affixed my signature in presence of two witnesses.

JOHN PRESTON McKEE.

Witnesses:
J. W. HANNA,
ELMER HOOPER.